Aug. 28, 1962 G. F. ABBOTT, JR., ETAL 3,051,850

TRANSISTOR MULTIVIBRATOR CIRCUIT WITH VARIABLE IMPEDANCE OPERATION STABILIZING MEANS

Filed Oct. 2, 1958 2 Sheets-Sheet 1

INVENTORS
GEORGE F. ABBOTT, JR.
FREDERICK D. PADDEN
BY Harold C. Herman
ATTORNEY INVENTORS
GEORGE F. ABBOTT, JR.
FREDERICK D. PADDEN
BY Harold C. Herman
ATTORNEY 3,051,850

TRANSISTOR MULTIVIBRATOR CIRCUIT WITH VARIABLE IMPEDANCE OPERATION STABILIZING MEANS

George F. Abbott, Jr., Berkeley Heights, and Frederick D. Padden, Jersey City, N.J., assignors to Bell Telephone Laboratories, Incorporated, New York, N.Y., a corporation of New York Filed Oct. 2, 1958, Ser. No. 764,897
20 Claims. (Cl. 307—88.5)

This invention relates generally to multivibrator circuits and more particularly to multivibrator circuits employing transistor devices.

A multivibrator circuit is one which has two states of operation and is capable of rapid transfer from one state of operation to the other. There are two features common to multivibrator circuits of the negative resistance type wherein transistor devices are employed as the active elements. The first of these features is that the transistor device employed has an alpha or current multiplication factor which is greater than unity. The alpha of a transistor device is defined as the ratio of the change in collector current to a given change in emitter current when the collector voltage is held constant. The second of these features is that an impedance of sufficient value to support regeneration is arranged in the base circuit of the transistor device. This external base impedance should be of a magnitude such that the product of the alpha and the external base impedance is greater than the sum of the external emitter impedance and the external base impedance.

The emitter current voltage characteristics of a transistor circuit having both of these features exhibits a negative resistance region bounded on each side by a positive resistance region with which it is continuous. This negative resistance region results from regeneration or positive feedback which is due to coupling between the collector electrode and the emitter electrode of the transistor device and the alpha across the external base impedance. The flow of base current in the transistor device due to an alpha greater than unity develops across the external base impedance a voltage of such polarity as to further forward bias the emitter-base junction thereof. The external base impedance promotes positive feedback so that the transistor is driven to saturation very rapidly.

Point contact transistors of the type disclosed in United States Patent 2,524,035 issued to J. Bardeen and W. H. Brattain on October 3, 1950 inherently possess an alpha which is greater than unity and are readily employed singly in monostable circuits. Junction transistors, however, inherently possess an alpha which is less than unity making them unsuitable for use singly in monostable circuits. A corelation of two junction transistors of opposite conductivity types to produce a three-terminal current multiplication device, as shown in United States Patent 2,655,609 issued to W. Shockley on October 13, 1953 and B. W. Lee Patent 3,009,069, issued November 14, 1961, may readily be employed as the active element in a monostable circuit.

It is desirable that multivibrator circuits possess a high degree of stability and reliability. Transistor devices per se which are employed in present day circuits inherently impose limitations upon the stability and reliability which can be expected therefrom. Such limitations result from the fact that transistor devices have not as yet been standardized to such a degree that transistor devices may be substituted one for the other without affecting the operation of the circuit. The substitution of transistors very often results in a shifting of the current-voltage characteristic curve with respect to the emitter load line. Such shifting of the current-voltage characteristic curve with respect to the emitter load line may result in a different operation of the circuit. The direction of shift of the characteristic curve can vary the magnitude of the triggering pulse required to transfer the monostable circuit from a low-current condition to a high-current condition, the difference in magnitude being determined by the amount and direction of shift of the current-voltage characteristic curve. This effect therefore produces an unreliable circuit operation. Such displacement of the current characteristic curve is also affected by variations in transistor parameters induced by changes in ambient temperature.

The displacement of the current-voltage characteristic curve due to substitution of transistor devices or due to changes in ambient temperatures may be partially traced to the effect of leakage currents in the transistor device. There is always a finite amount of leakage current flowing when a transistor device is in a reverse biased state. Part of this leakage current is found to flow in the base circuit. The amount of leakage current flow in the base circuit of a transistor device differs between individual transistors. As multivibrator circuits normally employ an external base impedance sufficiently large to support regeneration, a potential is developed by base leakage currents across the external base impedance which is a function of the leakage current flowing in the base circuit. This potential varies the biasing state of the emitter-base junction of the transistor device to cause a displacement of the current-voltage characteristic curve with respect to the emitter load line. The emitter load line remains essentially unaffected by the substitution of transistor devices or by changes in ambient temperatures.

However, the current-voltage characteristics of transistor devices without an external base impedance are more nearly alike. This is apparent if one considers that the potential of the base electrode is substantially unaffected by leakage current in the base circuit. If the base electrode were connected to a source of constant potential, e.g. ground, through a very small impedance, variations in base current would have virtually no effect upon the current-voltage characteristic curve of the device. In such an arrangement, leakage current flowing in the base circuit of the transistor device would not result in the application of a forward biasing potential to the emitter-base junction to vary the current-voltage characteristic curve.

It is also desirable that the monostable circuit be returned to the normal or stable state of operation immediately following the termination of the output pulse or a duty cycle. Limitations are often imposed upon the duty cycle of these circuits due to the timing capacitor having accumulated a charge during the high current operation which remains after the circuit has reset. Such accumulations must be eliminated before the monostable circuit can produce a standard pulse again. It is desirable that such accumulations be rapidly dissipated so that a maximum pulse repetition frequency be obtained. A subsequent triggering of the monostable circuit while such accumulated charge remains would result in a variation of output pulse duration and a possible decrease in the sensitivity of the circuit. To delay a subsequent triggering pulse until the timing capacitor has discharged to a point where the circuit has returned to its normal state will necessarily limit the output pulse frequency.

An object of this invention is to provide a transistor multivibrator circuit wherein the effect of base leakage current upon the reliability and stability thereof is effectively minimized.

A further object of this invention is to provide a transistor multivibrator circuit wherein the circuit operation is not materially affected by either the substitution of transistors or by ambient temperature changes.

Another object of this invention is to provide a multivibrator circuit having a high repetition frequency by providing during the interpulse interval for a rapid dissipation of charge accumulated on the timing capacitor.

Still another object of this invention is the provision of a multivibrator circuit operative to develop output pulses of controllable duration and constant amplitude.

The present invention accomplishes these objectives and overcomes the foregoing difficulties by providing a variable impedance or current control device in the base circuit of a monostable transistor device to stabilize the operation of the circuit by substantially eliminating the effect of base current upon the current-voltage characteristic curve thereof and, at the same time, providing for a rapid discharge of the timing capacitor upon the monostable circuit having reset. This is accomplished by the provision of a second transistor device so arranged that the emitter-collector circuit thereof acts as a variable impedance connected between the base electrode of the monostable transistor device and a source of constant potential, e.g. ground, and which is capable of a rapid transfer from a low impedance state to a high impedance state. The impedance state of the emitter-collector circuit of the second transistor device is determined by the operational state of the monostable circuit. The high impedance state of the emitter-collector circuit is such that regeneration or positive feedback is developed thereacross during conduction in the monostable transistor device. During the normal or low-current operation of the monostable transistor device, the second transistor device is conductive and the emitter-collector circuit thereof presents a very low impedance, insufficient to support regeneration, and effectively minimizes the effect of base current upon the current-voltage characteristic curve of the monostable transistor device.

A timing circuit including a timing capacitor is provided to control the duration of operation of the monostable transistor device in its high current state. This timing circuit is operative to apply the outpulse generated by the monostable transistor device to the base electrode of the second transistor device to effectively reverse bias the second transistor device to control the impedance state of the emitter-collector circuit thereof. This output pulse is also effective to develop a charge on a timing capacitor contained in the timing circuit so as to maintain the emitter-collector circuit of the second transistor device in its high impedance state for a predetermined time in interval. During the discharge of the timing capacitor, a high impedance is presented to base current by the emitter-collector circuit of the second transistor device and the monostable transistor circuit remains conductive. Accordingly, the timing capacitor discharges to a critical value at which the second transistor device becomes forward biased and the emitter-collector circuit thereof reverts to a low impedance state which is not sufficient to support regeneration. Thereupon, the circuit resets itself to a low conduction state of operation. An auxiliary discharge circuit is provided for the timing capacitor to partially discharge the capacitor upon the application of a triggering pulse to vary the duration of the output pulse.

The resultant charge developed on the timing capacitor due to the return of the monostable transistor circuit to a low conduction state of operation is quickly dissipated through the low impedance offered by the now forward biased emitter-base circuit of the second transistor device. The monostable transistor circuit is thus rapidly returned to a normal state of operation to await the application of a subsequent triggering pulse. Thus, the transsistor device arranged in the base circuit of the monostable transistor circuit acts both to minimize the effect of leakage currents which vary the current-voltage characteristic curve with respect to the emitter load line and to rapidly dissipate the accumulated charge on the timing capacitor during the interpulse interval to provide a faster duty cycle for the monostable circuit.

Accordingly, a feature of this invention is the provision of a transistor device arranged to determine the external base impedance in a monostable circuit so as to control necessary regeneration or positive feedback.

Another feature of this invention is the provision of a transistor device in the external base circuit of a transistor monostable circuit and arranged to control base current flow as determined by the operational state of the monostable circuit.

Still another feature of this invention is the provision of a timing capacitor arranged with respect to a transistor monostable circuit so as to control the operational state thereof and provided with a low impedance discharge path during the low conduction state of operation of the monostable circuit. The low impedance discharge path for the timing capacitor is provided by the transistor device utilized as an external base impedance to control regeneration.

A further feature of this invention is the provision of an auxiliary discharge path for the timing capacitor through which the timing capacitor is partially discharged to vary the output pulse duration. The timing capacitor is rapidly discharged through the auxiliary discharge path during the application of a triggering pulse so that the time required for the timing capacitor to discharge to a critical value is lessened. Accordingly, the output pulse developed by the multivibrator circuit is varied, the variation in the duration of such pulse being determined by the degree of partial discharge provided by the auxiliary discharge circuit.

Further objects and features will become apparent upon consideration of the following description taken in conjunction with the drawings wherein.

Figure 1:
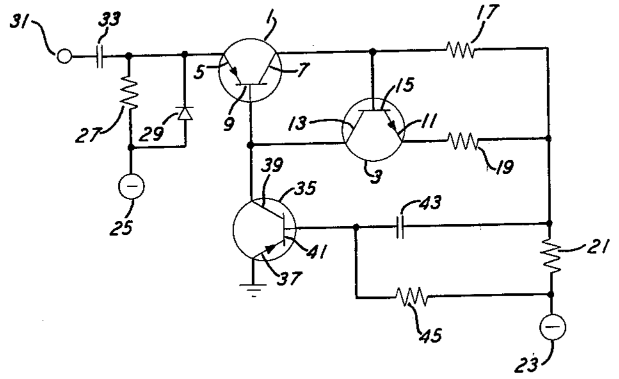
FIG. 1 is a schematic circuit diagram of a monostable circuit embodying the principles of the present invention utilizing a pair of junction transistors of opposite conductivity types cross-coupled to form a three-terminal current multiplication device.

Referring now to FIG. 1, there is shown a monostable circuit employing junction transistors 1 and 3 arranged in a cross-coupled configuration to provide for a composite or equivalent transistor device having an amplification factor or alpha which is greater than unity. The operation of such a composite transistor device is fully described in the above-identified application of B. W. Lee. However, a description of the operation of the composite transistor device will be briefly set forth herein.

Transistor 1 is shown as a p-n-p transistor having an emitter electrode 5, a collector electrode 7 and a base electrode 9. Transistor 3 is shown as an n-p-n transistor having an emitter electrode 11, a collector electrode 13 and a base electrode 15. The collector electrode 7 of transistor 1 is connected to the base electrode 15 of transistor 3 and the base electrode 9 of transistor 1 is connected to the collector electrode 13 of transistor 3. The junction of the collector electrode 7 and the base electrode 15 is connected to the emitter electrode 11 of transistor 3 through the resistors 17 and 19.

An analogy may be made of the circuit arrangement so far described to a conventional transistor device as the operation of the composite arrangement is such that the emitter electrode 5 of transistor 1 may be considered as an equivalent emitter electrode, the junction of the base electrode 9 and the collector electrode 13 may be considered an equivalent base electrode, and the junction of resistors 17 and 19 may be considered an equivalent collector electrode. Voltage source 23 is connected to the junction of resistors 17 and 19 through the load resistor 21 to provide operational potentials to the composite arrangement. An emitter biasing voltage source 25 is connected to the emitter electrode 5 through the parallel arrangement consisting of resistor 27 and diode 29. Diode 29 is poled in the direction of positive emitter current to provide for a low impedance current path for emitter current upon the initiating of current flow in the composite transistor arrangement. During the stable or nonconducting operation of the circuit, the diode 29 is reverse biased and acts essentially as an open circuit. To prevent the emitter electrode from "floating," the resistor 27 is provided so that the voltage of source 25 is applied to the emitter electrode 5 to maintain the emitter of the composite arrangement in a reverse biased state. Input terminal 31, which is connected to the emitter electrode 5 through the coupling capacitor 33, receives positive triggering pulses effective to forward bias the emitter-base junction of transistor 1. This positive triggering pulse is applied across the parallel arrangement of resistor 27 and diode 29 which is now reverse biased due to a more positive potential being applied to the cathode of diode 29 than is supplied to its anode.

A junction transistor 35 is connected to the junction of collector electrode 13 and base electrode 9. Transistor 35 is shown as a p-n-p transistor having an emitter electrode 37, a collector electrode 39 and a base electrode 41. The emitter-collector circuit of transistor 35 is connected between the junction of collector electrode 13 and base electrode 9 and a point of constant potential, i.e. ground. The base electrode 41 of transistor 35 is connected to the junction of resistors 17 and 19 and the load resistor 21 through the storage or timing capacitor 43. The base electrode 41 is also connected to the voltage source 23 through the resistor 45. The transistor 35 is, therefore, arranged to be in a normally forward biased condition due to the application of a negative potential from the voltage source 23 to the base electrode 41, the emitter electrode 37 being maintained at ground potential.

The base leakage current of the equivalent transistor device comprising the transistors 1 and 3 is the combined base leakage current of transistor 1 and the collector leakage current of transistor 3. These leakage currents are additive due to the transistors 1 and 3 being of opposite conductivity types. Transistor 35 is, however, effective while forward biased to provide through its emitter-collector circuit a low impedance current path for this combined leakage current. Therefore, only a very small voltage drop is developed by the flow of this combined leakage current across the emitter-collector circuit of the transistor 35 so that the current voltage characteristic curve of the composite circuit due to the effect of base currents upon circuit operation is minimized. The substitution of one transistor for another therefore does not substantially affect the current voltage characteristic curve of the composite transistor device.

The circuit depicted in FIG. 1 is arranged to operate as a monostable device. While junction transistors inherently have a current amplification factor which is less than unity, the composite transistor device hereinabove described has an effective current amplification factor greater than unity due to its cross-coupling arrangement and is readily adaptable for use in a monostable circuit. Upon the transistor 1 becoming forward biased due to the application of a triggering pulse at input terminal 31, collector current from transistor 1 is directed to a two-branch parallel arrangement, one branch consisting of resistor 17 and the other branch consisting of the emitter-base junction of transistor 3 in series with the resistor 19. That part of the collector current of transistor 1 injected into the base electrode 15 of transistor 3 is sufficient to forward bias the emitter-base junction thereof. The control of the alpha of the composite arrangement by the resistors 17 and 19 now becomes obvious. Part of the collector current of transistor 1 is shunted through the resistor 17 rather than being injected into and amplified by the transistor 3. The amount of the current shunted, therefore, depends upon the ratio of the resistance values of resistors 17 and 19. It has been found that a resistance value for resistor 19 should be about four times that of resistor 17 for proper circuit operation. The current through the load resistor 21 is, therefore, determined by the conduction in both of the transistors 1 and 3. A first current path is provided from the voltage source 25 through the low impedance presented by the diode 29 and the emitter-collector circuit of transistor 1 through the resistor 17. A second current path is provided through the emitter-collector circuits of transistors 3 and 35 and the resistor 19. The resultant drop caused by this current flow through the resistor 21 results in a less negative voltage appearing at the junction of the resistors 17 and 19. This abrupt change in voltage at the junction of resistors 17 and 19 is directed through the timing capacitor 43 and applied to the base electrode 41 of transistor 35. As the change of voltage at the junction of resistors 17 and 19 is in a positive direction, a positive potential is applied to the base electrode 41 which is sufficient to reverse bias the emitter-base junction of transistor 35. The charging circuit for the timing capacitor 43 is effective through the composite arrangement consisting of transistors 1 and 3 in a series arrangement with capacitor 43 and resistor 45.

A negative resistance input characteristic is provided for the composite arrangement upon the reverse biasing of the transistor 35. The impedance of the emitter-collector circuit of transistor 35 in a reverse biased state is of the order of 50,000 ohms. This order of magnitude for an external base impedance of a transistor device having a current amplification factor greater than unity is sufficient to support regeneration. Accordingly, sufficient voltage is developed by the current flow in the equivalent base circuit of the composite device to further forward bias the emitter-base junction of transistor 1 to rapidly drive the composite arrangement to saturation. The emitter circuit connected to the emitter electrode 5 or the equivalent emitter electrode of the composite arrangement is such that the emitter load line would normally intersect the resultant negative resistance input characteristic curve in each of the low current positive resistance region, the negative resistance region and the high current positive resistance region. However, the provision of the negative resistance input characteristic curve by the reverse biasing of transistor 35 is substantially simultaneous with an increase of voltage at the emitter electrode 5 so that the operating point of the circuit arrangement of FIG. 1 is transferred to the high current positive region of the curve. The circuit remains at this point of operation while the transistor 35 is reverse biased and the negative resistance characteristics are provided thereby. Upon the transistor 35 becoming forward biased to present a low impedance insufficient to support regeneration, the negative resistance input characteristics of the circuit arrangement collapses and the circuit reverts to its normal positive input characteristic. Accordingly, the circuit arrangement of FIG. 1 transfers to its single operating point of low conduction which is at the intersection of the emitter load line and the low current positive input resistance characteristics.

In monostable circuit arrangements wherein the timing capacitor is arranged in the emitter circuit, the input pulse effectively displaces the emitter load line to have it also intersect the high current positive resistance region of the negative resistance input characteristic curve to provide a high current operating point for circuit arrangement. The charging of the timing capacitor is effective to thereafter displace the emitter load line with respect to the negative resistance input characteristic until the emitter load line no longer intersects with the high current positive resistance region and the circuit reverts to a low conduction state. In other arrangements, for example, in the above-identified patent of B. W. Lee, the timing capacitor is disposed in a composite arrangement to effectively decrease the alpha with time to a point where regeneration no longer can be had. In the latter arrangement, the negative resistance input characteristic is varied with respect to the emitter load line to a point where the emitter load line intersects such curve only in the low current positive resistance region to affect a transfer to a low conduction state. However, in the above-described monostable circuit, the timing capacitor 43 does not operate either to displace the emitter load line or vary the negative resistance characteristics with respect to each other but affects the biasing condition of the transistor 35 so as to control the regeneration which provides for the negative resistance input characteristic curve. The regeneration present in the above-described monostable circuit is due to the effect of an alpha greater than unity across the high impedance presented by the emitter-collector circuit of transistor 35 when in a reverse biased state. Monostability is obtained by controlling the impedance offered to base current flow in the equivalent transistor device by the emitter-collector circuit of transistor 35.

Figure 3:
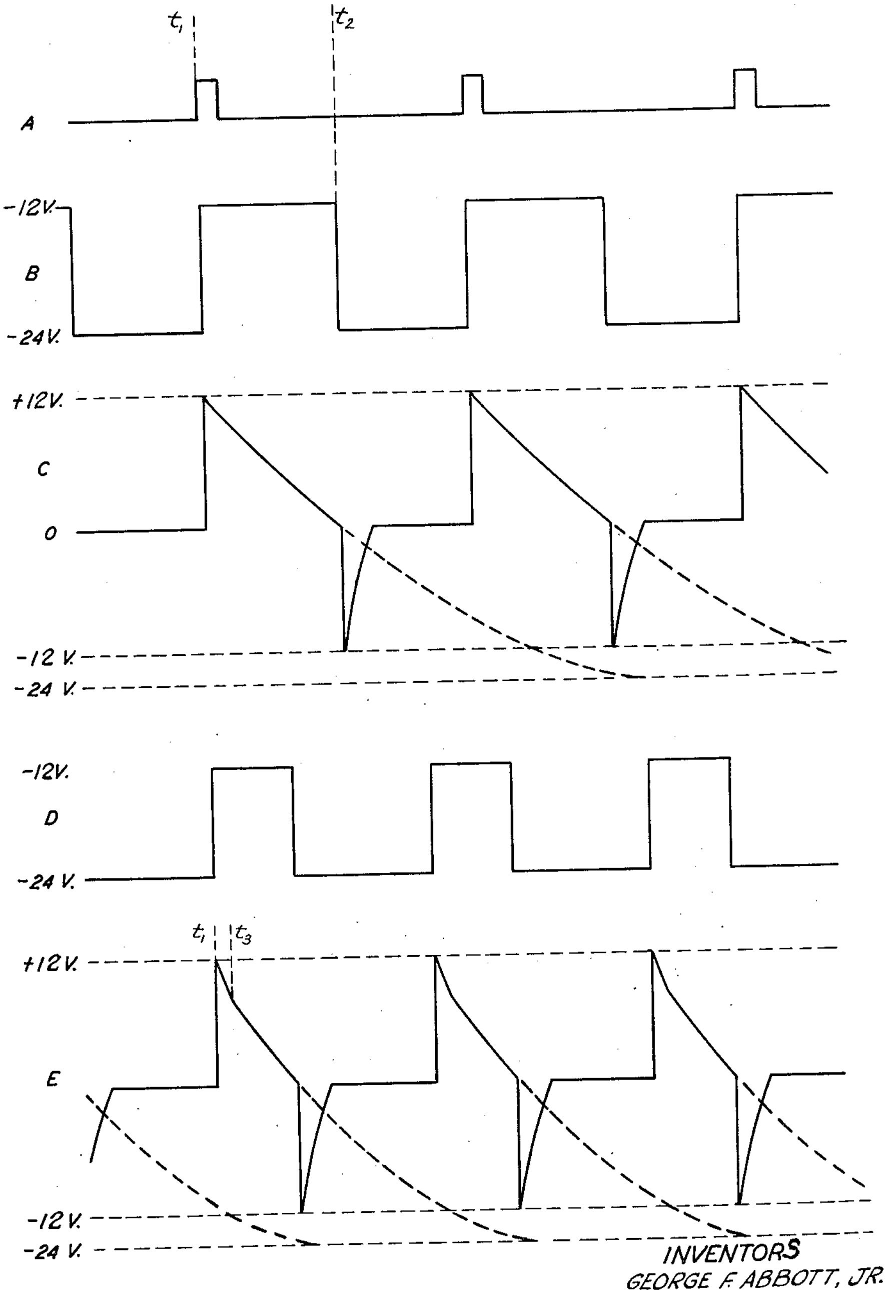
FIG. 3 shows a group of curves to facilitate an understanding of the monostable circuits of FIGS. 1 and 2.

FIG. 3 shows a group of curves which aids in the understanding of the monostable circuit of FIG. 1. The triggering pulses applied at terminal 31 are shown in curve A. These triggering pulses are of sufficient amplitude to overcome the effect of biasing source 25 and initiate conduction in transistor 1. Upon the emitter-base circuit of transistor 1 becoming forward biased, current flows through both the emitter-collector circuits of transistors 1 and 3 which results in a substantial voltage drop across the resistor 21. The voltage at the junction of resistors 17 and 19 thereupon becomes more positive. Considering the voltage source 23 to be of a magnitude of minus 24 volts and voltage source 25 to be of a magnitude of minus 6 volts, the voltage appearing at the junction of resistors 17 and 19 is of the order of approximately minus 12 volts or undergoes a positive rise of 12 volts. The voltage curve appearing at the junction of resistors 17 and 19 is shown in curve B. This sudden increase in voltage provides a potential increase at the base electrode 41 of the transistor 35 through the capacitor 43. Due to the transistor 35 being in a conductive state at this time, the voltage at the base electrode 41 is at approximately ground potential so that approximately plus 12 volts is applied thereto. The capacitor 43 is, accordingly, charged such that the plate connected to the base electrode 41 is a plus 12 volts and the plate connected to the resistor 21 is at approximately minus 12 volts. The voltage wave form appearing at the base electrode 41 due to capacitor 43 is given as curve C. The potential applied to the base electrode 41 by the capacitor 43 is sufficient to reverse bias the emitter-base junction of transistor 35 to place the very high impedance of the emitter-collector circuit in the base circuit of the composite transistor arrangement to initiate regeneration. Accordingly, the high impedance of the emitter-collector circuit of the transistor 35 acting as an external base impedance and the current amplification factor of the composite transistor arrangement being greater than one provides for negative resistance input characteristics. The emitter circuit of the composite arrangement is such that the emitter load line intersects the resultant negative resistance input characteristic in both the low and high current positive resistance regions during conduction. Accordingly, the composite transistor arrangement is provided with a second operating point and remains at saturation upon the termination of the triggering pulse. However, due to the fact that the capacitor 43 does not affect the composite alpha, neither the load line nor the emitter-current characteristic curve is displaced with respect to one another. This results in an output pulse of constant magnitude.

A discharge path for the capacitor 43 is provided primarily through the resistor 45. Accordingly, the capacitor discharges from plus 12 volts toward minus 24 volts and at the time $t_2$ approaches zero volts. At this time, the zero volts are applied to the base electrode 41 of transistor 35 to forward bias the emitter-base junction. Thereupon, transistor 35 begins to conduct and presents a low impedance in the external base circuit of the composite transistor arrangement. The dashed portion of curve C shows the normal discharge of capacitor 43 if the external base impedance used is of fixed magnitude. The presence of this low impedance is not sufficient to support regeneration so that the negative resistance input characteristic collapses and the composite transistor arrangement reverts very rapidly to a low current condition. It is evident that the duration of operation of the composite transistor arrangement in a saturated state is controlled by the discharge time of the capacitor 43 which determines the operating state of the transistor 35. Transistor 35 is effectively utilized as a current control or variable impedance device to provide for an external base impedance of sufficient magnitude to support regeneration only for a predetermined time after triggering of the composite arrangement as determined by the discharge of capacitor 43. The transistor 35 is reverse biased only upon the composite transistor arrangement having been driven into conduction.

Upon the transistor 35 being forward biased and the composite transistor device having reverted to a low conduction state, the voltage at the junction of resistors 17 and 19 again decreases to a value approximately equal to the voltage source 23 less the small drop across resistor 21. This is shown in FIG. 3 as occurring at the time $t_2$. This abrupt change in voltage is in the negative direction and of a magnitude of approximately 12 volts. This is shown in curve B as the trailing edge of the output pulse. This voltage is also applied to the base electrode 41 through the capacitor 43 and appears as a negative-going differentiated pulse, as shown in curve C. This voltage must be dissipated before the circuit can return to its normal state of operation. An attempt to trigger the monostable circuit if such voltage remains on the capacitor 43 results in a variation of output pulse duration. A charge of minus 12 volts appearing on the plate which is connected to the base electrode 41 drives the transistor 35 further into conduction. A voltage at the base electrode 41 or the capacitor voltage is, therefore, rapidly reduced to approximately ground potential through the low impedance of the emitter-base circuit of the now conducting transistor 35. A discharge path is, therefore, effectively provided for the capacitor 43 through the resistor 21 and the emitter-base circuit of transistor 35 for a very rapid discharge thereof. The charge on the capacitor 43 is very rapidly dissipated to normalize the monostable circuit so that a subsequent triggering thereof within a shorter time can be effected without variation in output pulse duration.

The effect of transistor 35 is, therefore, twofold. In the first instance, the transistor 35 is effective to provide the high impedance of its emitter-collector circuit in the external base circuit of the composite transistor arrangement to support degeneration. The transistor 35 is normally maintained in a conductive state to present a low impedance to base currents in the composite transistor device. The presence of this low impedance in the external base circuit of the composite transistor device minimizes the effect of base leakage currents upon the current-voltage characteristic curve to stabilize the triggering conditions. In the second instance, the transistor 35 operates to rapidly return the multivibrator circuit to its normal state by providing a low impedance discharge path to voltages which have accumulated on capacitor 43.

Figure 2:
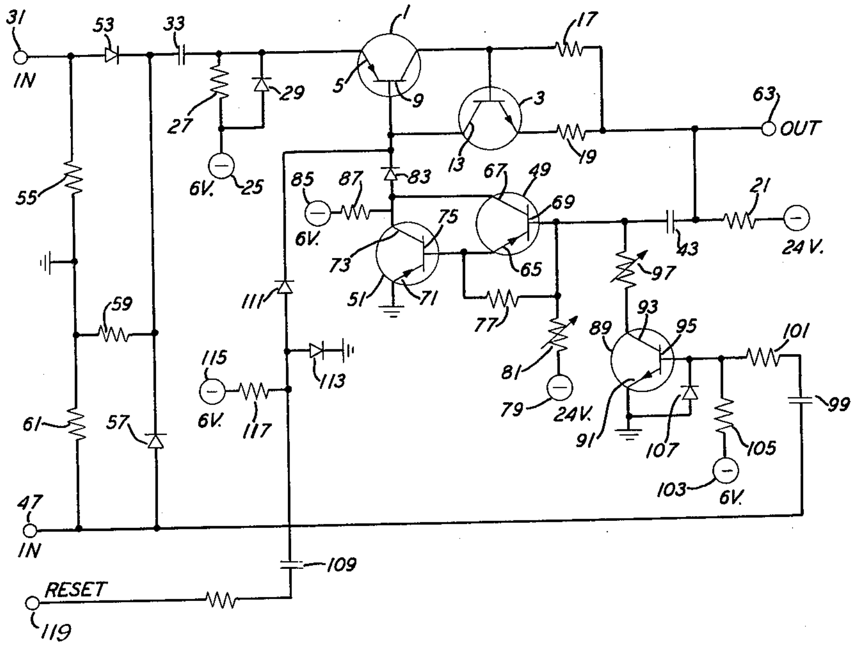
FIG. 2 is a schematic circuit diagram of a modification of the monostable circuit of FIG. 1 whereby output pulses of varying duration may be obtained.

Referring now to FIG. 2 wherein like numerals are used to denote similar elements appearing in FIG. 1, there is shown a modification of the monostable circuit appearing in FIG. 1. The circuit of FIG. 2 is provided with an input terminal 47 in addition to terminal 31. Transistors 1 and 3 are cross-coupled in a manner which has been set forth above and provided with resistors 17 and 19 to control the current amplification factor of the composite arrangement. The arrangement of transistors 49 and 51 has been substituted for the transistor 35 of FIG. 1. The arrangement of transistors 49 and 51, which acts essentially as a junction transistor as described in Patent 2,663,806 issued to S. Darlington on December 22, 1953, is such that a greater alpha may be achieved by the cross-coupling of the two transistors than is possible to achieve by the use of a single transistor. However, in such arrangements, the current amplification approaches but does not exceed unity. Moreover, by such arrangement, the transistor parameters are less effected by extraneous conditions.

The input terminals 31 and 47 are each connected to the emitter electrode 5. Input terminal 31 directs a positive-going triggering pulse through the diode 53 and the coupling capacitor 33 across the parallel arrangement of resistor 27 and diode 29 to the emitter electrode 5. The voltage which is directed through the diode 53 and capacitor 33 is developed across the resistor 55 which is connected between the input terminal 31 and ground. Input terminal 47 is connected to the emitter electrode 5 through the diode 57 and through the capacitor 33. The pulse received at input terminal 47 develops a voltage across the grounded resistors 59 and 61. The pulse received at input terminal 31 develops a voltage across the grounded resistors 55 and 59. The input pulses applied to terminals 31 and 47 are shown in FIG. 3 as curve A. The diodes 53 and 57 are each provided for isolation purposes so that pulses received at either the input terminal 31 or 47 are not fed back to the other terminal. The reception of a triggering pulse at either of the terminals 31 or 47 is effective to forward bias the emitter-base junction of transistor 1 to develop an output pulse at the output terminal 63.

As indicated above, the circuit included in the external base circuit of the equivalent transistor device comprises two p-n-p transistors 49 and 51 which are corelated to produce a single equivalent transistor device having an alpha which is less than one but greater than the alpha of each of the component transistors. The transistor 49 has an emitter electrode 65, a collector electrode 67 and a base electrode 69. The transistor 51 has an emitter electrode 71, a collector electrode 73 and a base electrode 75. The collector electrode 67 of transistor 49 is connected to the collector electrode 73 of the transistor 51. The base electrode 75 of the transistor 51 is connected to the emitter electrode 65 of the transistor 49. The inter-connection of the base electrode 75 with the emitter electrode 65 results in the emitter current of transistor 49 being a portion of the base current of the transistor 51. A resistor 77 is connected between the emitter electrode 65 and the base electrode 69 of transistor 49 so as to be in parallel with the emitter-base circuit thereof. The emitter current of transistor 49 is thereby determined by the respective values of resistor 77 with respect to the instantaneous value of the impedance presented by the emitter-base junction of transistor 49. A negative voltage source 79 is connected to the base electrode 69 of transistor 49 through variable resistor 81. The voltage source 79 is effective to maintain the emitter-base junction of the transistor 49 in a forward bias condition and at the same time forward biases the emitter-base junction of transistor 51 to maintain the arrangement of transistors 49 and 51 in a conductive state. The emitter-collector circuits of transistors 49 and 51 present a low impedance to base currents of the composite transistor device. The junction of collector electrodes 67 and 73 is connected to the junction of base electrode 9 and collector electrode 13 through the diode 83. Diode 83 is poled so as to offer a low impedance to the base current of the composite transistor device. A voltage source 85 is connected to the junction of diode 83 and the collector electrodes 67 and 73 through a resistor 87.

The circuit so far described has an operation similar to the circuit of FIG. 1. Conduction in the composite transistor device is effective to charge the capacitor 43 to such value whereat the arrangement of transistors 49 and 51 is reverse biased. Accordingly, a high impedance is offered to base current which is sufficient to support regeneration. However, a modification of the circuit of FIG. 1 is provided so that the output pulse duration available from the monostable circuit is determined not solely by the timing capacitor 43. Output pulses of different duration are obtained by applying a triggering pulse to either the input terminal 31 or 47. The application of a pulse to the input terminal 31 will develop an output pulse at the output terminal 63 which is determined solely by the capacitor 43 discharging in the manner described above with respect to FIG. 1. However, a triggering pulse applied to input terminal 47 is also directed to a transistor 89. Transistor 89 has an emitter electrode 91, a collector electrode 93 and a base electrode 95. The emitter-collector circuit of transistor 89 is arranged so that conduction therein will modify the charging path of the capacitor 43. The emitter-collector circuit of the transistor 89 is connected to the capacitor 43 through the variable resistance 97 and arranged in parallel with the variable resistance 81. Accordingly, the discharge path of the capacitor 43 includes the serially arranged emitter-base junction of the transistors 49 and 51, the latter being bypassed by the resistor 77, in parallel with the variable resistance 81, both of which are in parallel with the series arrangement of resistance 97 and the emitter-collector circuit of the transistor 89. When transistors 49, 51 and 89 are in a reverse bias condition, the impedance of this parallel circuit is effectively determined by the resistor 81.

Conduction in transistor 89 is effective to vary the impedance of the above-described parallel arrangement. Accordingly, the input terminal 47 is connected through a capacitor 99 to the base electrode 95 through the limiting resistor 101. A negative voltage source 103 is connected to the base electrode 95 through the resistor 105, and a diode 107, which is poled to present a low impedance to current flow from the source 103, is connected in parallel between the emitter electrode 91 and the base electrode 95. The voltage developed across the diode 107, which is of the order of 0.5 volt, is sufficient to maintain the emitter-base junction of the transistor 89 in a reverse bias state. The application of a positive pulse at the input terminal 47 is differentiated by the circuit including the capacitor 99 and the resistor 101 which is effective to forward bias the emitter-base junction of the transistor 89. Accordingly, the impedance presented to the discharge current of capacitor 43 through the series circuit including the resistor 97 and the emitter-collector circuit of the transistor 89 in parallel with the resistor 81 is reduced so that the capacitor 43 is rapidly discharged during the small interval of time that the transistor 89 is forward biased. Referring to FIG. 3, there is shown in curve E the curve of the voltage appearing on the plate of the capacitor 43 which is connected to the base electrode 69. During the interval of time $t_1$—$t_3$, the transistor 89 is maintained in a forward biased condition due to the charge developed on the capacitor 99 so that the discharge time constant of the capacitor 43 is reduced to rapidly drop the voltage appearing at the base electrode 69. The transistor 89 is maintained conductive during that time required for the charge on capacitor 99 to be dissipated. Upon the transistor 89 again becoming reverse biased, the discharge time constant is again effectively determined only by the resistor 81. It is evident that more than a single variation of output pulse duration can be developed by the circuit of FIG. 2. For example, the charge developed on the capacitor 99 is determined by the voltage magnitude of the triggering pulse. Therefore, if a pulse of greater magnitude were directed to the capacitor 99, a greater charge is developed thereon to maintain the transistor 89 forward biased for a longer period of time to further reduce the output pulse duration. The resultant output waveform due to the application of a triggering pulse at terminal 47 is shown in FIG. 3 as curve D. As the capacitor 43 discharges toward voltage source 79, it discharges to a point whereat the arrangement of transistors 49 and 51 again becomes forward biased. The dashed portion of curve E shows the normal discharge curve for the capacitor 43. At this time conduction begins in transistors 49 and 51 so that a low impedance is presented by the emitter-collector circuits of transistors 49 and 51 to base current flow through the composite transistor device and regeneration ceases.

Reset pulses may be provided if it is desired that the circuit be returned to its normal operation prior to the normal discharge of the timing capacitor 43. Accordingly, terminal 119 is provided to receive reset pulses which are directed through the coupling capacitor 109 to the base electrode 9 through the diode 111. A clipping diode 113 is provided to limit the magnitude of the reset pulse. A voltage source 115 is connected to the junction of coupling capacitor 109 and diodes 111 and 113 through the resistor 117. A positive reset pulse received at terminal 119 is directed through the above-traced circuit and applied at the cathode of diode 83. When the composite transistor arrangement is conducting the base electrode 9 is at approximately 6 volts. The source 115 is connected to the anode of diode 111 so that a clipping effect will not be had on the reset pulse. The reset pulse is applied to the base electrode 9 across the back impedance of diode 83. Diode 83 is effective to prevent the reset pulse being applied across the circuit including the reverse biased transistors 49 and 51. This reset pulse, therefore, effectively reverse biases the emitter-base junction of transistor 1 resulting in a negative increase of potential at the output terminal 63. This negative increase potential is directed through the capacitor 43 and applied through the base electrode 69 of transistor 49. The application of this negative potential to the base electrode 69 is effective to forward bias the transistor arrangements 49 and 51. Upon the transistor arrangements 49 and 51 becoming forward biased the low impedance of the emitter-collector circuit of transistor 51 is effective in the external base circuit of the composite transistor arrangement and regeneration cannot be supported. The circuit may in this way be prematurely transferred to a normal or low conduction state.

The above-described circuit arrangements are illustrative of the application of the principles of this invention. Numerous other arrangements may be devised by one skilled in the art without departing from the spirit and scope of the invention.

What is claimed is:

1. In a pulse generating circuit, a first and a second transistor of opposite conductivity type and each having an emitter, base and collector electrode, said base electrode of each of said transistors being electrically connected to said collector electrode of the other of said transistors, input terminal means connected to said emitter electrode of said first transistor, biasing means connected to said emitter electrode of said first transistor for normally reverse biasing said emitter electrode with respect to said base electrode, load means connected to said base and said emitter electrodes of said second transistor, a third transistor having a base electrode and an emitter-collector circuit, said emitter-collector circuit being connected to said base electrode of said first transistor and poled to direct current in the direction of normal base current through said first transistor, circuit means including a timing capacitor connecting said base electrode of said third transistor to said load means, and biasing means connected to said base electrode of said third transistor to normally maintain the emitter-base junction of said third transistor in a forward biased state.

2. In a pulse generating circuit, a first and a second normally nonconductive transistor of opposite conductivity type, each of said first and second transistors having an emitter electrode, a base electrode and a collector electrode, said base electrode of each of said transistors being electrically integral with said collector electrode of the other of said transistors to form an equivalent collector electrode and an equivalent base electrode, input terminal means connected to said emitter electrode of said first transistor, load means connected to said equivalent collector electrode, a source of potential, an external circuit connecting said equivalent collector electrode and said equivalent base electrode, said external circuit including a timing capacitor and a third transistor having a base electrode and an emitter-collector circuit, said emitter-collector circuit being connected between said equivalent base electrode and said source of potential, said timing capacitor operative upon conduction in said first and said second transistors to direct an output pulse from said equivalent collector electrode to said base electrode of said third transistor whereby said emitter-collector circuit offers a high impedance to current flow, and biasing means connected to said base electrode of said third transistor for normally maintaining said third transistor in a conductive condition wherein said emitter-collector circuit offers a low impedance to current flow.

3. In a multivibrator circuit, a first and a second transistor of opposite conductivity type and each having a base electrode, a collector electrode and an emitter electrode, said base electrode of said first transistor being connected with said collector electrode of said second transistor, means for connecting said collector electrode of said first transistor with said base and said emitter electrodes of said second transistor, input terminal means connected to said emitter electrode of said first transistor for receiving triggering pulses to initiate conduction therein, a third transistor having a base electrode and an emitter-collector circuit, said emitter-collector circuit being connected to said base electrode of said first transistor, biasing means connected to said base electrode of said third transistor to maintain said third transistor in a normally forward biased condition to provide for a low impedance current path for base leakage current through said first transistor, and circuit means including a timing capacitor connecting said base electrode of said third transistor to said collector electrode of said first transistor and to said base and emitter electrodes of said second transistor and operative upon conduction in said first and second transistors to direct an output pulse developed thereby to said base electrode of said third transistor whereby said emitter-collector circuit presents a high impedance to current flow to provide with said first and second transistors for negative resistance input characteristic.

4. In a pulse generating circuit, a first and a second transistor of opposite conductivity type and each having an emitter, a base and a collector, input terminal means for receiving triggering pulses connected to said emitter of said first transistor, said base of each of said transistors being electrically connected to said collector of the other of said transistors, load means connected to said base and said emitter of said second transistor, a point of fixed potential, variable impedance means having a first impedance condition and a second impedance condition and connecting said base of said first transistor to said point of fixed potential for providing in said second impedance condition with said first and said second transistor for a negative resistance input characteristic, means for normally maintaining said variable impedance means in said first impedance condition, and circuit means connecting said load means and said variable impedance means for transferring said variable impedance means to said second impedance condition upon conduction in said first and second transistors, said circuit means including means for determining the duration of operation of said variable impedance means in said second impedance condition.

5. A pulse generator as described in claim 4 wherein said determining means includes capacitive storage means arranged to be charged by conduction in said first and said second transistors for determining the duration of operation of said variable impedance means in said second impedance condition.

6. A pulse generator as described in claim 5 including means connected to said capacitive storage means for partially discharging said capacitive storage means upon the application of each of said triggering pulses at said input terminal whereby the duration of operation of said variable impedance means in said second impedance condition is shortened.

7. A pulse generator as described in claim 6 wherein said input terminal means are adapted to receive triggering pulses of varying voltage magnitude, and wherein said generator comprises in addition means connected to said partial discharging means and responsive to said triggering pulses for controlling the duration of operation of said partial discharging means whereby the duration of operation of said determining means is related to the magnitude of said triggering pulses.

8. In a pulse generating circuit, a transistor device having a base electrode, a collector electrode and an emitter electrode, load means connected to said collector electrode, a first variable impedance means connected to said base electrode and having a first and a second impedance condition, said first variable impedance means in said second condition providing with said transistor device for a negative resistance input characteristic, conductive means connecting said first variable impedance means and said load means and responsive to said transistor device upon conduction therein to place said first impedance means in said second condition, said conductive means including a timing capacitor arranged to be charged upon conduction in said transistor device and operative to determine the duration of said second condition, a first and a second input terminal connected to said emitter electrode, and means connecting said second input terminal to said timing capacitor including a discharge path for said timing capacitor, said discharge path having a second variable impedance means having an operative low and a normally high impedance condition, and means connected at said second input terminal for controlling said second impedance means to provide a low impedance discharge path for said timing capacitor whereby the output pulse duration of said generating circuit is shortened.

9. In a pulse generating circuit, a first and a second transistor of opposite conductivity type, each of said first and second transistors having a base electrode, a collector electrode and an emitter electrode, input means connected to said emitter electrode of said first transistor, said base electrode of each of said transistors being electrically connected to said collector electrode of the other of said transistors to form an equivalent transistor device having a current amplification factor greater than unity, load means connected to said base and emitter electrode of said second transistor, variable impedance means coupled to said base electrode of said first transistor to control base current flow through said first transistor, said variable impedance means having a normal impedance condition and an operative impedance condition for supporting regeneration, biasing means for normally maintaining said variable impedance means in said normal impedance condition, and circuit means including a timing capacitor connecting said variable impedance means to said load means for transferring said variable impedance means to said operative impedance condition, said timing capacitor being operative to control the time interval during which said variable impedance means remains in said operative condition.

10. In a pulse generating circuit, a first transistor device having an emitter electrode, a base electrode, and a collector electrode, load means connected to said collector electrode of said transistor device, first and second input terminal means connected to said emitter electrode of said transistor device for receiving input triggering pulses, a source of constant potential, a second transistor device having an emitter-collector circuit and a base electrode, said emitter-collector circuit being connected between said base electrode of said first transistor device and said source of constant potential, biasing means connected to said base electrode of said second transistor device to normally maintain the emitter-base junction of said second transistor device in a normally forward biased state so as to provide a low impedance path to base current flow through said first transistor device, means including a capacitive storage device connecting said base electrode of said second transistor device to said load means and operative upon conduction in said first transistor device for reverse biasing the emitter-base junction of said second transistor device for a predetermined duration whereby said emitter-collector circuit provides with said first transistor device for a negative resistance input characteristic, and means connected to said capacitive storage device for partially discharging said capacitve storage device upon an input pulse being received at said second input terminal means whereby the time interval during which the emitter-base junction is reverse biased is shortened.

11. In a pulse generating circuit in accordance with claim 10 wherein said partial discharging means includes variable impedance means connected to said capacitive storage means, said variable impedance means having a normally high impedance condition and an operative low impedance condition for rapidly discharging said capacitive storage means whereby a triggering pulse at said second input terminal means produces an output pulse of shorter duration than an input triggering pulse at said first input terminal means.

12. In a pulse generating circuit, a transistor device having an emitter electrode, a base electrode and a collector electrode, input terminal means for receiving triggering pulses to initiate conduction in said transistor device connected to said emitter electrode, load means connected to said collector electrode, a current control device connected to said base electrode and arranged to conduct normal base current, and circuit means connecting said current control device to said collector electrode, said circuit means including a capacitive timing device operative to control said current control device whereby the base current in said transistor device is limited to provide with said transistor device for negative resistance input characteristics.

13. In a pulse generating circuit, a transistor device having emitter, collector and base electrodes, said transistor device having a current amplification factor greater than unity, input terminal means connected to said emitter electrode for receiving input triggering pulses, load means connected to said collector electrode, and an external circuit connecting said collector and said base electrodes, said external circuit including control means connected to said base electrode for providing with said transistor device a negative resistance input characteristic whereby said generating circuit is provided with a stable and an unstable state of operation, said control means having a normal and an operative condition, said external circuit also including timing means to control the time interval during which said control means is in said operative condition.

14. A transistor circuit comprising a transistor device having an effective alpha greater than unity, means for providing a stable operation condition to said transistor device, regeneration promoting means for providing an unstable operating condition to said transistor device, input terminal means for receiving input pulses of varying voltage magnitude, said transistor device being operative to transfer from said stable operating condition to said unstable operating condition upon the appearance of one of said input pulses at said input terminal means, said regeneration promoting means being operative to maintain said transistor device in said unstable operating condition, timing means for limiting the duration of operation of said regeneration promoting means to transfer said transistor device to said stable operating condition, and means connected to said input terminal means for controlling the duration of operation of said timing means according to the voltage magnitude of said one input pulse.

15. A transistor circuit comprising a transistor device having an effective alpha greater than unity, means for providing a stable operating condition to said transistor device, regeneration promoting means for providing an unstable operating condition to said transistor device, input terminal means for receiving input pulses of varying voltage magnitudes, said transistor device being operative to transfer from said stable operating condition to said unstable operating condition upon the appearance of one of said input pulses, said regeneration promoting means being operative to maintain said transistor device in said unstable operating condition, capacitor means for timing the duration of operation of said regeneration promoting means whereby said transistor device is again transferred to said stable operating condition, and control means connected to said capacitor means and said input terminal means and including a variable impedance current path for said capacitor means and first means for determining the impedance of said current path according to the magnitude of said one input pulse.

16. A transistor circuit as set forth in claim 15 wherein said current path includes the emitter-collector circuit of an additional transistor device, and wherein said first means includes means connected to the base electrode of said additional transistor device for determining the duration of the conductive condition of said additional transistor device according to the magnitude of said one input pulse.

17. A transistor circuit comprising a transistor device having an effective alpha greater than unity, means for providing a stable operating condition for said transistor device, regeneration promoting means connected to said transistor device for providing an unstable operating condition to said transistor device, terminal means for receiving input pulses, said transistor device being operative to transfer from said stable operating condition to said unstable operating condition upon the appearance of one of said pulses, said regeneration promoting means being operative to maintain said transistor device in said unstable operating condition, capacitor means for timing the duration of operation of said regeneration promoting means, first means for normally providing a first discharging path for said timing capacitor, second means for temporarily providing a second discharge path for said timing capacitor whereby the time required for said timing capacitor to discharge to a critical voltage level for inhibiting said regeneration promoting means is shortened, and control means connected to said terminal means for determining the operation of said second means.

18. In a transistor circuit as set forth in claim 17 wherein said terminal means includes means for receiving input pulses of varying voltage magnitude and wherein said control means includes timing means for controlling the duration of operation of said second means according to the voltage magnitude of said one input pulse.

19. In a transistor device as set forth in claim 17 further comprising second input terminal means for receiving input pulses for transferring said transistor device to said unstable condition of operation whereby the time required for said timing capacitor to discharge to said critical voltage level is independent of the voltage magnitude of said one input pulse and is controlled solely by said first means.

20. In a transistor circuit as set forth in claim 17 wherein said second means comprises the emitter-collector circuit of an additional transistor and wherein said control means are connected to the base electrode of said additional transistor.

References Cited in the file of this patent

UNITED STATES PATENTS

| | | |
|---|---|---|
| 2,655,609 | Shockley | Oct. 13, 1953 |
| 2,751,545 | Chase | June 19, 1956 |
| 2,776,382 | Jensen | Jan. 1, 1957 |
| 2,827,574 | Schneider | Mar. 18, 1958 |
| 2,840,727 | Guggi | June 24, 1958 |
| 2,930,905 | McVey | Mar. 29, 1960 |
| 2,935,572 | Hastings et al. | May 3, 1960 |
| 2,935,698 | Adams | May 3, 1960 |